Figure 1:
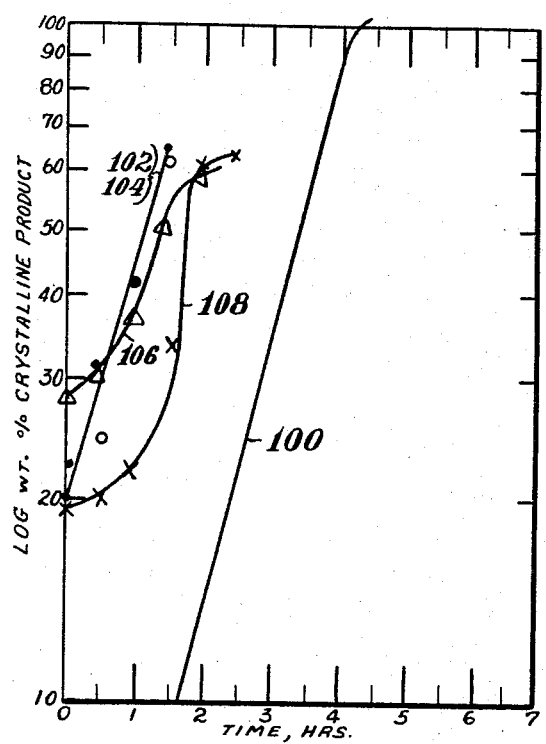

May 23, 1967   G. T. KERR   3,321,272
PROCESS FOR MAKING CRYSTALLINE ZEOLITES
Filed Dec. 27, 1962

United States Patent Office 3,321,272
Patented May 23, 1967

---

3,321,272
PROCESS FOR MAKING CRYSTALLINE ZEOLITES
George T. Kerr, Cherry Hill Township, Camden County, N.J., assignor to Mobil Oil Corporation, a corporation of New York
Filed Dec. 27, 1962, Ser. No. 247,572
4 Claims. (Cl. 23—113)

This invention relates to a process for synthesizing crystalline aluminosilicate molecular sieves and, more particularly, to a novel process of synthesizing molecular sieves by means of a unique seeding technique.

Certain zeolitic materials have been demonstrated to have catalytic capabilities for conversion of organic materials. Such zeolitic materials are ordered crystalline within which there are passages, pores or cavities of definite ranges of size. Since the dimensions of these pores are such as to accept for adsorption molecules of certain dimensions while rejecting those of larger dimensions, these materials have become to be known as "molecular sieves" and are utilized in a variety of ways to take advantage of these properties.

These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation using ion exchange techniques which are well known in the art. By means of such cation exchange, it is possible to vary the size of the pores in a given aluminosilicate by suitable selection of the particular cation. The spaces between the tetrahedra are occupied by molecules of water prior to dehydration, the aluminosilicate being activated by means of such dehydration.

A complete description of zeolites of the foregoing type is found in Patent 2,971,824, whose disclosure is hereby incorporated herein by reference.

In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$ and $y$ the moles of $H_2O$, the removal of which produces the characteristic open network system and which activates the aluminosilicate for use as a catalyst.

At the present time, a variety of such molecular sieves are available commercially. For example, molecular sieves are on the market which are known as the "A" series, such molecular sieves including materials which, expressed in terms of moles of oxides, have the following composition:

$$1.0 \pm 0.2 M_{2/n}O:Al_2O_3:1.85 \pm 0.5 SiO_2:yH_2O$$

where M represents a metal cation, $n$ represents the valence of M and $y$ may be any value up to about 6.

Another synthetic molecular sieve available on the open market is that of the "X" series which, expressed in terms of moles of oxides, has the following composition:

$$1.0 \pm 0.2 M_{2/n}O:Al_2O_3:2.5 \pm 0.5 SiO_2:yH_2O$$

wherein M is a metal cation, $n$ represents the valence of M and $y$ is a value up to 8 depending upon the identity of M and degree of hydration of the crystal. A crystalline sodium aluminosilicate which has pores or channels of approximately 13 Angstrom units in diameter is available commercially under the name of molecular sieve 13X. As usually prepared, the 13X material contains water and has the unit cell formula $$Na_{86}[(AlO_2)_{86}(SiO_2)_{106}] \cdot 267H_2O$$

A synthetic zeolite known as molecular sieve 10X is a crystalline aluminosilicate having an effective pore diameter of about 10 Angstrom units and which has had a substantial proportion of its sodium ions replaced by calcium.

All of the molecular sieves of the "X" series have a crystal structure identical to that of faujasite, a naturally occurring aluminosilicate.

Still another synthetic aluminosilicate having the crystal structure of faujasite is that of the Y series which, expressed in oxide mole ratios, has the following formula:

$$0.9 \pm 0.2 Na_2O:Al_2O_3:wSiO_2:yH_2O$$

wherein $w$ is a value ranging from 3 to 6 and $y$ may be any value up to about 9.

Molecular sieves are ordinarily prepared initially in the sodium form of the crystal, the sodium ions in the resulting product being exchangeable for other cations as previously mentioned. In general, the process of preparation of such materials involves heating, in aqueous solution and under atmospheric pressure or less, an appropriate mixture of oxides or of materials whose chemical composition can be completely represented as a mixture of oxides $Na_2O$, $Al_2O_3$, $SiO_2$ and $H_2O$ at a temperature of approximately 210 C. to 150° C. and preferably 100° C. for periods of 15 minutes to 90 hours or more. The material which is first formed on mixing the reactant is an amorphous gel which, after the reaction has proceeded sufficiently, forms a crystalline product which may be separated therefrom and water washed until the water in equilibrium, with the zeolite has a pH in the range of 9 to 12. The crystals are then dried at a temperature between 25° C. and 150° C. After activating by heating until dehydration is attained i.e., at 350° C. and 1 mm. pressure, the substance is ready for use.

In copending application Ser. No. 3,574, filed Jan. 20, 1960, now Patent No. 3,071,434, and entitled "Process for Making Crystalline Zeolites," a novel method was disclosed of producing molecular sieves of the "A" series which could be carried out on a continuous basis and which provided numerous advantages over prior art processes for making such "A" sieves, including a significant decrease in the reaction time involved in the preparation of such sieves. In its essential aspects, the invention disclosed in said copending application involved the introduction into the reaction mixture utilized to form the "A"-type zeolite of a quantity of previously formed crystal of the "A"-type to serve as a seed, which seed had the unexpected property of enhancing the rate om crystallization of the desired zeolite. It was specifically pointed out in said copending application, however, that while the novel process discolsed therein was especially suitable for manufacture of the "A" series of molecular sieves, the technique was surprisingly not applicable for synthesizing other molecular sieves, particular mention being made of the "X" series. The reason for the distinction was attributed to a difference in the mechanism of crystal growth for different types of molecular sieves.

In accordance with the present invention, it has now been unexpectedly determined that seeding processes are indeed applicable to the production of molecular sieves other than those of the "A" series providing only that the seed employed is a partially crystallized mass of like zeolite (with respect to the desired molecular sieve). While generally applicable to molecular sieves as a broad class, the seeding process of the present invention is particularly advantageous for the preparation of synthetic zeolites having a faujasitic crystal structure.

It is accordingly a primary object of the present invention to provide a novel process for producing molecular sieves by means of a unique seeding technique involving the use of partially crystallized zeolite seeds.

It is another primary object of the present invention to provide a novel process for producing a molecular sieve by means of the use of seeds of a partially crystallized zeolite of the crystal structure of the sieve to be produced, said molecular sieve being produced in a reduced reaction time and without the accompanying production of undesirable by-products.

A further object of the present invention is to provide a process of producing molecular sieves involving the pre-saturation of at least one of the reactants used to form the reaction mixture with a pre-formed partially crystallized zeolite of the type desired to be produced and the addition to the reaction mixture of an additional quantity of said pre-formed zeolite.

It is another important object of the present invention to provide a novel process of producing molecular sieves having a crystal structure of that of faujasite without the accompanying production of non-faujasitic by-products.

It is a further object of the present invention to provide a novel process for producing molecular sieves of the "X" series in a significantly reduced period of time and without the production of non-"X"-type crystalline impurities.

It is still a further object of the present invention to provide a novel process for producing molecular sieves of the "Y" series in significantly shorter reaction times without the production of non-"Y"-type crystalline impurities.

It is a further important object of the present invention to provide a novel process for producing molecular sieves having a crystal structure of that of faujasite utilizing a novel seeding technique which essentially involves the introduction into the reaction mixture of pre-formed and pure crystals of the type being produced.

It is a further object of the present invention to provide a novel process of producing molecular sieves comprising seeding the reaction mixture utilized to form said molecular sieves with seed crystals having the same crystal structure as the molecular sieve desired to be synthesized, said seed crystals having been prepared by stopping crystallization in the reaction mixture containing said seed crystals before such time as crystals other than those having said crystal structure are formed.

It is still a further object of the present invention to provide a novel process for producing molecular sieves having a silica:alumina ratio of at least 2:1 comprising seeding the reaction mixture utilized to form said molecular sieves with seed crystals having the same crystal structure as the molecular sieve desired to be synthesized, said seed crystals having been prepared by stopping crystallization in the reaction mixture containing said seed crystals before such time as crystals other than those having said crystal structure are formed.

It is another important object of the present invention to provide a novel process of producing molecular sieves having a crystal structure of that of faujasite involving the pre-saturation of at least one of the reactants used to form the reaction mixture with a pre-formed and pure crystal seed of the type desired to be produced and the addition to the reaction mixture of additional pre-formed seed crystals.

It is still another important object of the present invention to provide a novel process for the formation of molecular sieves having a crystal structure of that of faujasite involving a crystal seeding technique and as a result of which a crystalline product of the desired type may be formed under much more flexible reaction conditions than has previously been felt necessary.

Figure 2:
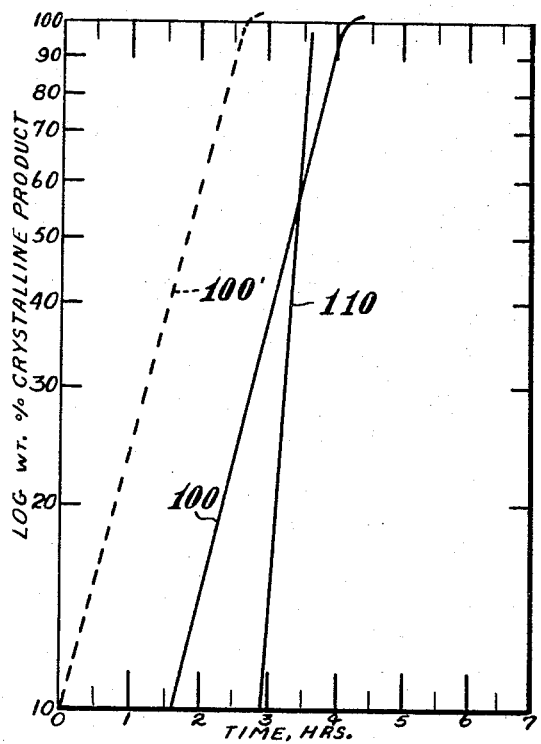

These and further objects and advantages of the present invention will become more apparent upon reference to the ensuing description and appended claims, and drawings wherein:

FIGURE 1 is a graph illustrating the formation of crystalline product of a 13X molecular sieve under varying reaction conditions; and FIGURE 2 is a graph illustrating the nature of the crystal growth of a 13X molecular sieve and a non-faujasitic molecular sieve from the same reaction mixture.

As previously indicated, it was felt at the time of the filing of said copending application 3,574 that the seeding process described therein was peculiarly applicable to molecular sieves of the "A" series but was not otherwise useful in the preparation of molecular sieves. More specifically, it was felt at the time of the filing of such application that the use of the seeding technique for sieves other than those of the "A" series produced erratic results, including sluggish reaction rates as well as the production of undesired crystalline products along with the desired molecular sieve crystals.

A particularly good example of the problems which were felt to be involved in the use of the seeding technique for non-"A"-type sieves is found in connection with the production of sieves of the "X" series. As previously indicated, zeolites of the "X" series are generally prepared by providing a reaction mixture having a composition expressed in terms of oxide mole ratios falling within the ranges of $Na_2O/SiO_2$ of about 1.2–1.5, $SiO_2/Al_2O_3$ of about 3–5 and $H_2O/Na_2O$ of about 35–60. Consistent with these specifications, what will hereinafter be referred to as a "standard zeolite X preparation" was made by adding a boiling solution of 83.8 g. of sodium metasilicate nonahydrate dissolved in 250 ml. of water as rapidly as possible (in 5 seconds or less) and with stirring to a boiling solution of 18.3 g. sodium aluminate (41.0 wt. percent $Al_2O_3$:34.6 wt. percent $Na_2O$) dissolved in 150 ml. of water. Stirring was continued for 1 to 2 minutes to give a smooth, creamy gel and the reaction mixture thereafter permitted to set with no agitation at 100° C. Within about 1¾ hours approximately 10% by weight of the reaction mixture had crystallized and after about 4¼ hours, the mixture had finished crystallizing. (This process is identified as run 100 in Table 1.) As will be seen in FIGURE 1 on the curve representing this run 100, the graph of log wt. percent of crystalline product plotted against the time in hours is substantially linear with a slight leveling off at a point above 90% crystallization. When the product obtained by run 100 was compared with a conventional "X"-type sieve available on the market as Linde 13X, the product of run 100 was considered to have been equivalent to a yield of 103% of 13X, using the Linde 13X as 100%.

In order to determine the effect of seeding the reaction mixture in the manner suggested in said copending application 3,574, four tests were conducted as follows: sodium aluminate and sodium metasilicate solutions, used as reagents in forming the standard zeolite X preparation, were each separately saturated with the Linde 13X previously referred to at 100° C. The excess zeolite was removed by filtration, fresh Linde 13X added to the sodium metasilicate, and the latter mixture then added, as usual, to the sodium aluminate. The resulting reaction mixture was then stirred throughout the reaction. The results of two such experiments, identified as runs 102 and 104, are set forth in FIGURE 1, FIGURE 1 also containing the curves for two additional runs (106 and 108) in which the pre-saturation of the reactants with Linde 13X was omitted. [*Note.*—While the curve for runs 102 and 104 overlapped, the results of run 102 are shown on FIGURE 1 as small dots and those of run 104 as larger circles.]

While these data clearly show that seeding of zeolite X preparation can be effective, it is to be noted that in all cases the zeolite X growth stopped at some point between the 60-70% crystallization level. It was further noted in the course of such runs that a second crystal phase, clearly not identified as a zeolite of the "X" series, is formed from such seeded reaction mixtures.

Problems similar to those set forth above in connection with the use of seeding to promote molecular sieve crystallization are also associated with the formation of other molecular sieve varieties, zeolites of the "Y" series being a particularly good example. It has now been found, however, that such problems may be either greatly reduced or completely eliminated by means of a modified seeding technique which, generally speaking, involves the seeding of the reaction mixture with a partially crystallized zeolite mass containing zeolite crystals of the type desired to be synthesized.

This invention may again best be described in connection with the preparation of molecular sieves of the "X" series. It is a peculiar feature of the reaction mixture used to form zeolites of the "X" series that the identical reaction mixture may also be employed to form a molecular sieve having a different crystal structure and composition from that of the X-type sieve, which different sieve will hereinafter be referred to as of the ZK-1 series. For example, zeolite ZK-1 was prepared by adding a boiling solution of 83.8 g. of sodium metasilicate in 100 ml. of water, with stirring, to a boiling solution of 18.3 g. of sodium aluminate dissolved in 300 ml. of water. In this case, however, the silicate was added to the aluminate over a period of 25-30 seconds, instead of under 5 seconds as was the case in connection with the preparation of the zeolite X described previously. In addition, the reaction mixture was continually stirred at 100° C. even after the initial formation of a smooth, creamy gel. The resulting product had the composition

$$Na(AlO_2 \cdot 1.6SiO_2)1.85H_2O$$

This procedure, which will hereinafter be referred to as involving the "standard ZK-1 preparation," is graphically illustrated by a curve identified as run 110 in FIGURE 2. As will be seen in FIGURE 2, formation of the ZK-1 did not take place in any significant amount until almost 3 hours had elapsed, the crystallization following that point, however, taking place quite rapidly. Experimental data have shown that the prime determinant in whether a given reaction mixture of the foregoing constituency forms zeolite X or zeolite ZK-1 is the rate of addition of the silicate to the aluminate in the preparation of the reaction mixture. Where the two are added together in less than about 5 seconds, amorphous material is yielded which preferentially tends to crystallize to zeolite X. Slow addition (i.e., in 25-35 seconds as previously indicated) yields a different amorphous material that is a precursor of ZK-1. Intermediate rates of addition, viz., between 5 and 25 seconds, is apt to yield a mixture of both X and ZK-1. The zeolite X amorphous gel spontaneously yields zeolite X nuclei in preference to ZK-1 nuclei; ZK-1 nuclei are formed from ZK-1 amorphous solid. Each type of gel can produce either type X or ZK-1, depending upon which type of seed or nuclei are present. In addition, ZK-1 appears to be formed only from reaction mixtures that are stirred after the initial formation of the smooth, creamy gel material, zeolite X crystal formation not being sensitive to stirring.

The foregoing facts are extremely significant with respect to he present invention since while the zeolite X and ZK-1 series seem to involve independent reaction conditions insofar as their formation is concerned, the line between the formation of the two is extremely fine and it seems apparent that at least a slight formation of ZK-1 can hardly be avoided during the formation of zeolite X, regardless of the care with which the reaction is maintained. For example, even when a pure seed obtained from a partially crystallized reaction mass was used to form a zeolite X and the product of the latter used to seed a standard zeolite X preparation (see run 111 in Table 1), a substantial quantity of ZK-1 was obtained in admixture with the desired zeolite X.

It is the foregoing phenomena which may be used to explain what happened in runs 102, 104, 106 and 108 previously described in connection with FIGURE 1, and in which formation of zeolite X stopped between the 60 and 70% levels. The materials with which the reaction mixtures of these runs was seeded was, as previously stated, a conventionally available Linde zeolite X material (Linde 13X). This material, having been made according to conventional techniques, contained only about 85% zeolite of the "X" series, the remainder including ZK-1 and possible other non-"X"-type material. Since a given seed material tends to promote the formation of like crystals as stated above, whatever quantity of ZK-1 was present in such seed material tended to induce the formation of ZK-1 crystal and, as a result, the formation of zeolite X terminated between the 60 and 70% levels.

In accordance with the present invention, the problems mentioned above are either reduced or greatly eliminated by the utilization of a seed material of like crystalline constituency of that ultimately desired to be obtained but which has resulted from only partial crystallization of the reaction mass used to form such seed.

Again, this essential inventive concept may be explained by reference to the formation of zeolites of the "X" series. As will be seen in FIGURE 2, zeolite of the ZK-1 series does not begin to form in any substantial quantity until almost 3 hours have elapsed, at which time the quantity of the reaction mass which has been converted to crystalline product of the "X" series may be somewhere between 30 and 35% by weight (i.e., see the curve for run 100. In accordance with the present invention, the material used as seed is obtained from a reaction mass the crystallization of which is interrupted before the point is reached at which any ZK-1 forms, i.e., as related to the runs on FIGURE 2, in less than about 3 hours. Since no zeolite ZK-1 will form until this time, the crystal present in said partially crystallized reaction mass will be stantially pure zeolite X.

This substantially pure zeolite X may then be used to seed conventional zeolite X reaction mixtures with truly significant advantages. For example, as shown in Table 1 hereinafter to be set forth, in runs 112, 114 and 116 a standard zeolite X preparation seeded with substantially pure zeolite X obtained by a partial crystallization method as described above produced from 100 to 104% yield of 13X product (compared with the standard Linde 13X previously mentioned) in significantly less time than was involved in run 100, which is also shown in Table 1. At the same time, substantially no ZK-1 formation took place. As will also be seen in Table 1, such partial crystallization technique is even quite effective where the reaction mixture is stirred following the initial formation of a creamy gel (runs 114 and 116), whereas other runs involving stirring (runs 104, 108, 118) resulted at least partially in the formation of ZK-1. The use of such pure seed material obtained through the partial crystallization technique described above is even more outstanding in its implications since even starting with a standard ZK-1 reaction mixture but using pure 13X seed obtained in the manner described above, one will be more likely to obtain substantially pure 13X crystal product in high yield without any significant trace of ZK-1 than would be the case without such pure seed. Thus, the partial crystallization technique of the present invention provides extremely signficant advantages in the production of molecular sieves.

The mechanism by which the advantageous results of the present invention are obtained is related to the "population growth law" described in said copending application 3,574. As set forth in that application, the rate of growth of new crystal once a substantial amount of crystal is already present in the reaction mixture obeys a population growth law best expressed by the formula:

$$\log \frac{C_f}{C_i} = kT$$

in which $C_f$ and $C_i$ denote the degrees of conversion to crystals, in the reaction mixture slurry, or levels of crystallization, at the end and the beginning respectively, of an interval of time T. Both $C_f$ and $C_i$ are expressed as:

$$\frac{\text{Weight of crystals in a unit volume of slurry}}{\text{Weight of crystals plus weight of residual crystallizable solids in a unit volume of slurry}} = \times 100$$

After mixing with new crystal-forming ingredients, the level of crystallization is initially reduced in the reaction mixture to a value $C_i$. The newly formed mixture, after a residence time T in the reactor, again emerges with a concentration $C_f$. The $k$ shown in the above formula is a constant, the value of the constant being governed by the temperature and the concentration of sodium hydroxide in the reaction mixture.

Relating the foregoing to the production of zeolite X and the graph of FIGURE 2, when the pure 13X seed is added, for example, to the reaction mixture of run 100, the curve formed by plotting log wt. percent crystalline product versus the time in hours is shifted to the left as shown by the dotted line indicated by the numeral 100′, whose upper limit intersects the 100% crystalline product formation level before the 3 hour mark is ever reached and, accordingly, before any formation of ZK-1 can take place as shown in FIGURE 2. As a result, a pure X product is the result.

The novel partial crystallization technique of the present invention is, as above stated, especially desirable in the formation of molecular sieves of the "X" series. In general, in fact, the process of the present invention is particularly useful for the formation of molecular sieves having silica/alumina ratios of at least about 2/1.

The present invention is, however, also applicable to the preparation of other types of molecular sieves. For example, in the preparation of other faujasitic materials, such as zeolite Y, a crystalline seed of the Y variety withdrawn from a reaction mixture in which crystallization was interrupted prior to the formation of any non-Y crystals is particularly advantageous. Similarly, such partially crystallized seed may be used to form molecular sieves of the ZK-1 variety. Illustrative of other zeolites which may be formed by the technique of the present invention are those of the Y, L and D series.

The formula for zeolite Y expressed in oxide mole ratios is:

$$0.9 \pm 0.2 Na_2O : Al_2O_3 : wSiO_2 : yH_2O$$

wherein $w$ is a value ranging from 3 to 6 and $y$ may be any value up to about 9.

The composition of zeolite L in oxide mole ratios may be represented as:

$$1.0 \pm 0.1 M_{2/n}O : Al_2O_3 : 6.4 \pm 0.5 SiO_2 : yH_2O$$

wherein M designates a metal cation, $n$ represents the valence of M, and $y$ is any value from 0 to 7.

The formula for zeolite D, in terms of oxide mole ratios, may be represented as:

$$0.9 \pm 0.2 [xNa_2O : (1-x)K_2O] : Al_2O_3 : wSiO_2 : yH_2O$$

wherein $x$ is a value of 0 to 1, $w$ is from 4.5 to about 4.9 and $y$, in the fully hydrated form, is about 7.

Other synthetic crystalline aluminosilicates which can be formed include those designated as zeolites R, S, T, Z, E, F, Q and B.

The formula for zeolite R in terms of oxide mole ratios may be written as follows:

$$0.9 \pm 0.2 Na_2O : Al_2O_3 : wSiO_2 : yH_2O$$

wherein $w$ is from 2.45 to 3.65, and $y$, in the hydrated form, is about 7.

The formula for zeolite S in terms of oxide mole ratios may be written as:

$$0.9 \pm 0.2 Na_2O : Al_2O_3 : wSiO_2 : yH_2O$$

wherein $w$ is from 4.6 to 5.9 and $y$, in the hydrated form, is about 6 to 7.

The formula for zeolite T in terms of oxide mole ratios may be written as:

$$1.1 \pm 0.4 x Na_2O : (1-x) K_2O : Al_2O_3 : 6.9 \pm 0.5 SiO_2 : yH_2O$$

wherein $x$ is any value from about 0.1 to about 0.8 and $y$ is any value from about 0 to about 8.

The formula for zeolite Z in terms of oxide mole ratios may be written as:

$$K_2O : Al_2O_3 : 2SiO_2 : yH_2O$$

wherein $y$ is any value not exceeding 3.

The formula for zeolite E in terms of oxide mole ratios may be written as:

$$0.9 \pm 0.1 M_{2/n}O : Al_2O_3 : 1.95 \pm 0.1 SiO_2 : yH_2O$$

wherein M is a metal cation, $n$ is the valence of the cation, and $y$ is a value of 0 to 4.

The formula for zeolite F in terms of oxide mole ratios may be written as:

$$0.95 \pm 0.15 M_{2/n}O : Al_2O_3 : 2.05 \pm 0.3 SiO_2 : yH_2O$$

wherein M is a metal cation, $n$ is the valence of the cation, and $y$ is any value from 0 to about 3.

The formula for zeolite Q, expressed in terms of oxide mole ratios, may be written as:

$$0.95 \pm 0.05 M_{2/n}O : Al_2O_3 : 2.2 \pm 0.05 SiO_2 : yH_2O$$

wherein M is a metal cation, $n$ is the valence of the cation, and $y$ is any value from 0 to 5.

The formula for zeolite B may be written in terms of oxide mole ratios as:

$$1.0 \pm 0.2 M_{2/n}O : Al_2O_3 : 3.5 \pm 1.5 SiO_2 : yH_2O$$

wherein M represents a metal cation, $n$ is the valence of the cation, and $y$ has an average value of 5.1 but may range from 0 to 6.

Still other synthesized crystalline aluminosilicates which may be formed with the seeding technique of the present invention include those designated as ZK-4 and ZK-5.

ZK-4 can be represented in terms of mole ratios of oxides as:

$$0.1 \text{ to } 0.3R : 0.7 \text{ to } 1.0 M_{2/n}O : Al_2O_3 : 2.5 \text{ to } 4.0 SiO_2 : yH_2O$$

wherein R is a member selected from the group consisting of methylammonium oxide, hydrogen oxide and mixtures thereof with one another, M is a metal cation, $n$ is the valence of the cation, and $y$ is any value from about 3.5 to about 5.5. As usually synthesized, zeolite ZK-4 contains primarily sodium cations and can be represented by unit cell formula:

$$7.5 \pm 2 Na : 2 \pm 0.5 H : 9 \pm 2 AlO_2 : 15 \pm 2 SiO_2$$

The major lines of the X-ray diffraction pattern of ZK-4 are set forth in Tablet 1 below:

TABLE 1

| $d$ value of reflection in A. | $100 I/I_0$ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |

| $d$ value of reflection in A.: | 100 $I/I_0$ |
|---|---|
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK–4 can be prepared by preparing an aqueous solution of oxides containing $Na_2O$, $Al_2O_3$, $SiO_2$, $H_2O$ and tetramethylammonium ion having a composition, in terms of oxide mole ratios, which falls within the following ranges:

$SiO_2/Al_2O_3$ _____ 2.5 to 11
$Na_2O/Na_2O+[(CH_3)_4N]_2O$ _____ 0.5 to 2.5
$H_2O/Na_2O+[(CH_3)_4N]_2O$ _____ 25 to 50
$Na_2O+[(CH_3)_4N]_2O/SiO_2$ _____ 1 to 2

ZK–5 is representative of another crystalline aluminosilicate which is prepared in the same manner as zeolite ZK–4 except that N,N'-dimethyltriethylenediammonium hydroxide is used in place of tetramethylammonium hydroxide. ZK–5 may be prepared from an aqueous sodium aluminosilicate mixture having the following composition expressed in terms of oxide mole ratios as:

$SiO_2/Al_2O_3$ _____ 2.5 to 11
$Na_2O/Na_2O+[(CH_2)_6N_2(CH_3)_2]OH$ _____ 0.5 to 2.5
$H_2O/Na_2O+[(CH_2)_6N_2(CH_3)_2]OH$ _____ 25 to 50
$Na_2O+[(CH_2)_6N_2(CH_3)_2]OH/SiO_2$ _____ 1 to 2

The N,N'-dimethyltriethylenediammonium hydroxide used in preparing ZK–5 can by prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

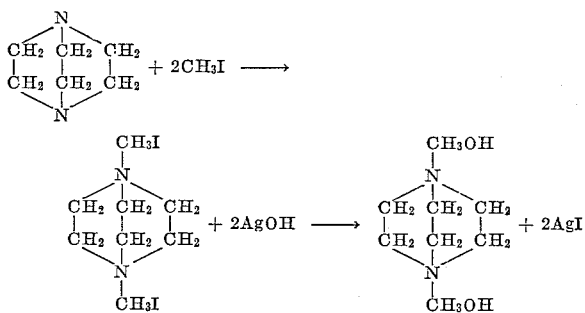

In using the N,N'-dimethyltriethylenediammonium hydroxide compound in the preparation of ZK–5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methylammonium ion is converted to hydrogen ion.

Quite obviously, the above-listed molecular sieves are only representative of the synthetic crystalline aluminosilicate molecular sieves which may be synthesized by means of the partial crystallization technique of the present invention, the particular enumeration of such sieves not being intended to be exclusive. Thus, whether the sieve in question is of the X, Y, ZK–1, A, the above-enumerated sieves, or any other molecular sieve, the important consideration is that the partial crystallization technique previously described provides a method which is useful for forming any molecular sieve and which is not restricted, as was the situation in said copending application 3,574 previously described, to only certain types of molecular sieves due to problems involved in the production of the others.

With the exception of the novel partial crystallization technique of the present invention, the general methods of preparation of molecular sieves are well known in the art. For example, suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide has often been used as the source of the sodium ion and also to contribute to the regulation of the pH. All the reagents utilized are preferably soluble in water and, in fact, are used in aqueous solution. The particular proportions of materials will, quite obviously, vary depending upon the constituency of the final molecular sieve desired to be made.

The extent to which a given reaction mass should be crystallized to form seed crystals will necessarily vary depending upon the molecular sieve ultimately desired to be formed as well as upon commercial practicalities. For example, in the case of zeolite X, the crystallization must be stopped before any ZK–1 begins to form. Where the zeolite X reaction mixture has been very carefully prepared and the reaction variables maintained so as to provide optimum conditions for the production of zeolite X to the exclusion of ZK–1, the crystallization may be carried out even as far as the 90% level without danger of ZK–1 contamination. Such careful control was exercised to form the pure X seed used in runs 112, 114 and 116 in Table 1, a 75% crystallization cut-off point having been chosen as a safety factor. In commercial practice, an even greater safety factor would probably be desirable and, for such purposes, the extent of crystallization of the reaction mixture for pure X seeds should not exceed 40% by weight and preferably not in excess of 30% by weight of the total reaction mixture mass. In connection with the other molecular sieves, a similar rule will prevail, that is, crystallization of the reaction mass should be terminated during the formation of the seed material before such time as any undesired crystal formation commences, with reasonable leeway being provided as a safety factor.

The quantity of seed to be added to the reaction mass for seeding purposes will be dependent primarily on commercially practicable considerations. Even a minimal quantity of seed material will produce some beneficial results, the upper limit being dictated by practical considerations in that if a given reaction mixture contains an inordinately high proportion of seed, it would obviously not be advantageous from a cost standpoint to use this procedure.

As will be seen by reference to Table 2 some advantage is obtained by pre-saturating the reagents used to form the reaction mixture with the seed crystal. Accordingly, it is a feature of the present invention to utilize such presaturation technique for particularly improved results. In addition, since ZK–1 formation is particularly receptive to stirring of the amorphous reaction mass, it is preferable in the formation of zeolite X to permit the amorphous material to stand without agitation after the formation of a smooth, creamy gel.

In Table 2 set forth below appears data for a number of runs relevant to the present invention. A number of these runs have been previously discussed while others have not been so discussed but are nevertheless pertinent at least to an understanding of the present invention. In this table, the reference "Stand. 13X" refers to the standard zeolite X preparation previously identified. "Stand. ZK–1" refers to the standard ZK–1 preparation previously identified. Under the column marked "Stirring," the term "regular" refers to a stirring rate (after the formation of a smooth, creamy gel) of approximately 100–500 r.p.m. using a conventional table mixer and the term "fast" refers to stirring rates two or three times the regular stirring rate. Under the column marked "Time for 13X Growth," the 10% figures represent the time which elapsed when approximately 10% by weight of the reaction mixture had formed 13X and the "Finish" column indicates the time elapsed when 13X crystals had completed their formation, and a similar breakdown is applicable to the column marked "Time for ZK–1 Growth."

seed crystals having the crystal structure of faujasite and which have been made from a reaction mixture used to prepare said crystalline aluminosilicate molecular sieve prior to completing crystallization of said last mentioned reaction mixture and before such time as crystals other than those having the crystal structure of faujasite are formed.

2. In a method for synthesizing a solid crystalline aluminosilicate molecular sieve having pores of uniform size, having the crystal structure of faujasite and which may be represented in terms of mole ratios of oxides as follows:

$$xM_{2/n}O : Al_2O_3 : ySiO_2 : zH_2O$$

wherein M is a metal cation; $n$ represents the valence of M; $x$ is about 0.7–1.2; $y$ is about 2.0–6.0; and $z$ is up to about 9, the improvement comprising: seeding the amorphous mixture of materials used to form said molecular sieve with previously formed crystals having the crystal structure of faujasite with the identity set forth above, said previously formed crystals having been made from a reaction mixture used to prepare said crystalline aluminosilicate molecular sieve prior to completing crystallization of said last mentioned reaction mixture and before such time as crystals of a crystal structure and molar constituency different from those of said previously formed crystals have had time to form.

TABLE 2

| Run | Type Reaction Mixture | Seed | Stirring | Time for 10% 13X Growth, hrs. | Time for 13X Growth Finish, hrs. | Maximum percent Yield 13X | Time for ZK-1 Growth 10% hrs. | Time for ZK-1 Growth Finish, hrs. | Maximum percent Yield ZK-1 |
|---|---|---|---|---|---|---|---|---|---|
| 110 | Stand. ZK-1 | None | Regular | | | <10 | 3.0 | 3.75 | 100 |
| 120 | Stand. ZK-1 | Z-K1 | do | | | <10 | 0.5 | 1.25 | 100 |
| 122 | Stand. ZK-1 | 13X [2] | do | | | <10 | 1.25 | 1.75 | 100 |
| 124 | Stand. ZK-1 | 13X [2] | Fast | | | <10 | 1.0 | 1.5 | 100 |
| 126 | Stand. ZK-1 | ZK-1 | do | | | <10 | 1.0 | 1.5 | 100 |
| 128 | Stand. 13X | ZK-1 | None | | | <10 | 2.0 | 3.0 | 100 |
| 130 | Stand. ZK-1 | ZK-1 | do | | | <10 | 2.25 | 3.5 | 100 |
| 111 | Stand. 13X | 13X [3,6] | Regular | | 2.0 | 87 | | | <15 |
| 100 | Stand. 13X | None | None | 1.75 | 4.25 | 103 | | | |
| 132 | Stand. 13X | 13X [2] | do | 1.5 | 3.0 | 85 | | | <15 |
| 134 | Stand. 13X | 13X [2,6] | do | 1.75 | 2.75 | 83 | | | 15 |
| 136 | Stand. 13X | 13X [2,6] | do | 1.75 | 2.75 | 83 | | | 15 |
| 112 | Stand. 13X | 13X [1] | do | | 3.5 | 100 | | | |
| 114 | Stand. 13X | 13X [1] | Regular | | 3.5 | 104 | | | |
| 116 | Stand. 13X | 13X [1,6] | do | | 3.0 | 102 | | | |
| 138 | Stand. ZK-1 [4] | None | None | | 6.75 | 83 | | | Trace. |
| 140 | Stand. ZK-1 | 13X [2] | do | | 2.5 | 30 | 2.0 | 2.5 | 60 |
| 142 | Stand. ZK-1 | None | do | | | 0 | | | 0 |
| 108 | See footnote 5 | 13X [2] | Regular | 1.25 | 2.0 | 63 | 2.0 | 2.5 | 30 |
| 104 | do | 13X [2,6] | do | 0.75 | 1.5 | 62 | 1.5 | 2.0 | 30 |
| 118 | do | None | do | 2.0 | 3.5 | 64 | 3.5 | 4.5 | 35 |
| 106 | Stand. 13X | 13X [2] | do | 1.0 | 2.0 | 60 | 2.0 | | 35 |
| 102 | Stand. 13X | 13X [2,6] | Fast | 0.5 | 1.5 | 65 | 1.5 | 2.0 | 35 |

[1] The seed material was obtained from a standard zeolite X preparation in which crystallization was stopped at 3.75 hours, yielding 75% of 13X for seed purposes.
[2] The seed used was commercially available Linde 13X, which contained approximately 85% of zeolite X, the remainder being other crystalline material.
[3] The product of run 116 was used as seed for this run.
[4] In this run, the silicate was added to the aluminate in less than 5 seconds.
[5] To prepare this reaction mixture, the sodium metasilicate was dissolved in 350 ml. of $H_2O$ and this was added to the sodium aluminate which was dissolved in 50 ml. of $H_2O$ in 5–10 seconds.
[6] In this run, the starting solutions were pre-saturated with seed before the regular seeding operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a method for synthesizing a solid crystalline aluminosilicate molecular sieve having the crystal structure of faujasite, the improvement comprising seeding the reaction mixture utilized to form said molecular sieve with 3. A method as defined in claim 2 wherein, prior to the mixing of the reactants utilized to form said reaction mixture, at least one of said reactants was saturated with said previously formed crystals.

4. A method for synthesizing a solid crystalline aluminosilicate molecular sieve having pores of uniform size and having the crystal structure of faujasite comprising preparing a reaction mixture having a composition expressed in terms of oxide mole ratios falling within the following ranges:

$Na_2O/SiO_2$ _____ About 1.2–1.5
$SiO_2/Al_2O_3$ _____ About 3–5
$H_2O/Na_2O$ _____ About 35–60 said reaction mixture being seeded with previously formed crystals of said molecular sieve, said previously formed crystals having the formula in terms of mole ratios:

$$xM_{2/n}O: Al_2O_3: ySiO_2: zH_2O$$

wherein M is a metal cation; $n$ represents the valence of M; $x$ is about 0.8–1.2; $y$ is about 2–3 and $z$ is up to about 8; crystals of said molecular sieve having been made from a reaction mixture used to prepare said crystalline aluminosilicate molecular sieve as set forth above prior to completing crystallization of said last-mentioned reaction mixture and before such time as crystals other than those having the crystal structure of faujasite and having a formula different from that of said formula have formed; and causing said first mentioned reaction mixture containing said previously formed crystals to crystallize.

References Cited by the Examiner

UNITED STATES PATENTS

| | | | |
|---|---|---|---|
| 2,882,244 | 4/1959 | Milton | 23—112 X |
| 2,904,607 | 9/1959 | Mattox et al. | 252—455 X |
| 3,071,434 | 1/1963 | Frilette et al. | 23—113 |
| 3,119,660 | 1/1964 | Howell et al. | 23—112 |

OTHER REFERENCES

Barrer et al.: "Jr. Chem. Soc.," May 1952, pages 1561–1571.

OSCAR R. VERTIZ, *Primary Examiner.*

MILTON WEISSMAN, *Examiner.*

E. J. MEROS, *Assistant Examiner.*